United States Patent
Dinan et al.

(10) Patent No.: US 7,117,583 B2
(45) Date of Patent: Oct. 10, 2006

(54) METHOD AND APPARATUS USING A PRE-PATTERNED SEED LAYER FOR PROVIDING AN ALIGNED COIL FOR AN INDUCTIVE HEAD STRUCTURE

(75) Inventors: Thomas Edward Dinan, San Jose, CA (US); Jeffrey S. Lille, San Jose, CA (US); Son Van Nguyen, Los Gatos, CA (US); Hugo Alberto Emilio Santini, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 10/101,196

(22) Filed: Mar. 18, 2002

(65) Prior Publication Data

US 2003/0174435 A1 Sep. 18, 2003

(51) Int. Cl.
*G11B 5/17* (2006.01)
*C25D 7/06* (2006.01)

(52) U.S. Cl. ............................... 29/603.25; 29/603.23; 29/603.24; 29/602.1; 205/118; 205/135

(58) Field of Classification Search ............... 29/602.1, 29/603.25, 606, 847, 603.23, 603.24, 603.26, 29/603.07; 205/119, 134, 135, 118, 149; 216/41, 48, 62, 87
See application file for complete search history.

(56) References Cited

U.S. PATENT DOCUMENTS

| | | | |
|---|---|---|---|
| 5,059,278 A | 10/1991 | Cohen et al. | |
| 5,112,448 A | 5/1992 | Chakravorty | |
| 5,450,263 A | 9/1995 | Desaigoudar et al. | |
| 5,578,342 A | 11/1996 | Tran et al. | |
| 5,665,251 A | 9/1997 | Robertson et al. | |
| 5,684,660 A | 11/1997 | Gray et al. | |
| 5,788,854 A | 8/1998 | Desaigoudar et al. | |
| 5,875,080 A | 2/1999 | Seagle | |
| 5,883,762 A * | 3/1999 | Calhoun et al. | 205/119 X |
| 5,901,431 A | 5/1999 | Santini | |
| 6,094,116 A | 7/2000 | Tai et al. | |
| 6,111,724 A | 8/2000 | Santini | |
| 6,139,696 A | 10/2000 | Arunachalam et al. | |
| 6,171,966 B1 * | 1/2001 | Deacon et al. | 216/62 X |
| 6,319,837 B1 * | 11/2001 | Chittipeddi et al. | 216/41 X |

FOREIGN PATENT DOCUMENTS

JP 54-20926 * 2/1979 ............. 205/135 X

OTHER PUBLICATIONS

"Process Application for the Production of Permalloy Structures in Thin Film Magnetic Heads," IBM Technical Disclosure Bulletin, vol. 39, No. 6, Jun. 1996, pp. 195-197.

* cited by examiner

*Primary Examiner*—A. Dexter Tugbang
(74) *Attorney, Agent, or Firm*—David W. Lynch; Chambliss, Bahner & Stophel P.C.

(57) ABSTRACT

A method and apparatus using a pre-patterned seed layer for providing an aligned coil for an inductive head structure. The method uses an aligned process where the base plate imprint is fabricated on an electrically insulating layer and the reversed image is fabricated and etched into the coil insulation material, e.g., hard bake photoresist to alleviate the problems associated with complete ion removal of the seed layer between high aspect ratio coils. The method would also not be prone to plating non-uniformities (voids), and would not be subject to seed layer undercutting in a wet etch step process.

20 Claims, 15 Drawing Sheets

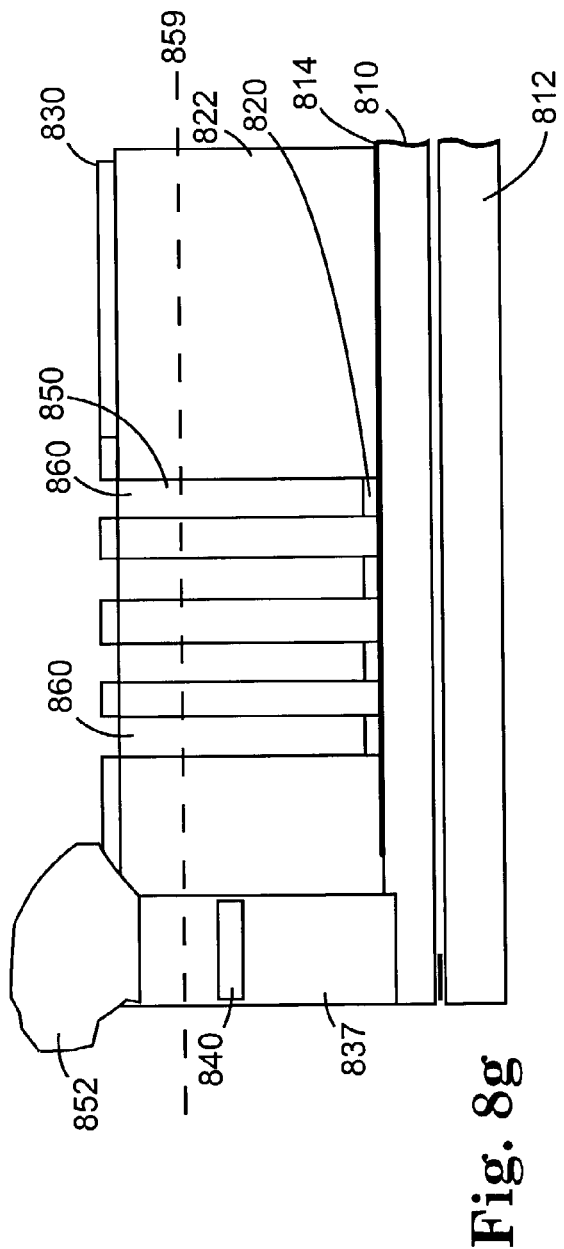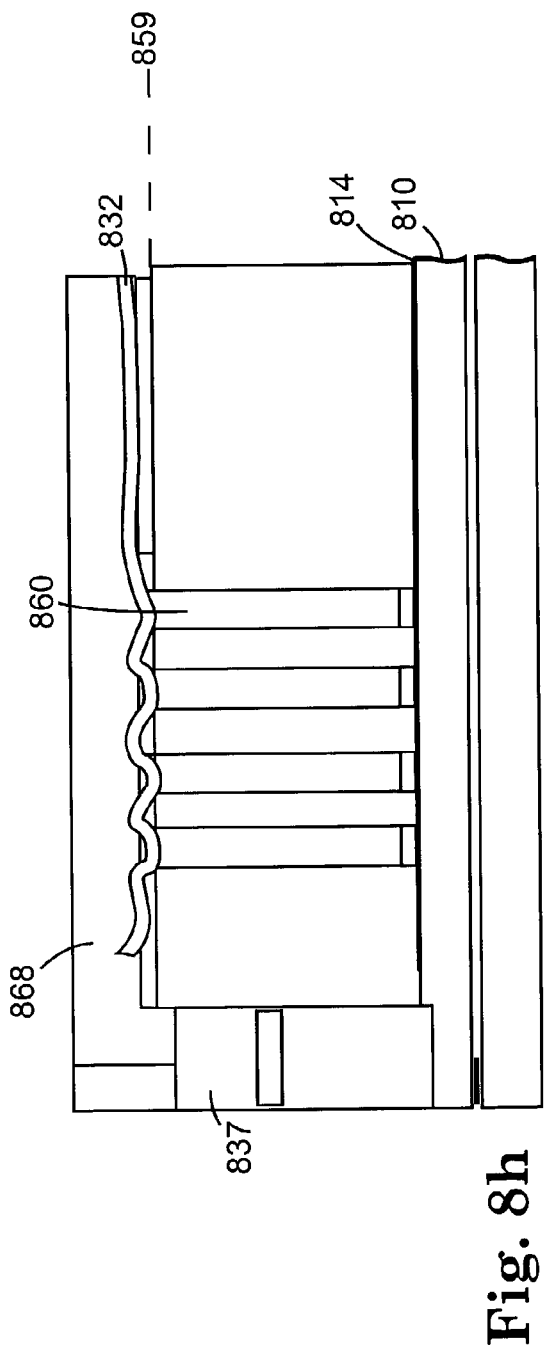
Fig. 8g
Fig. 8h

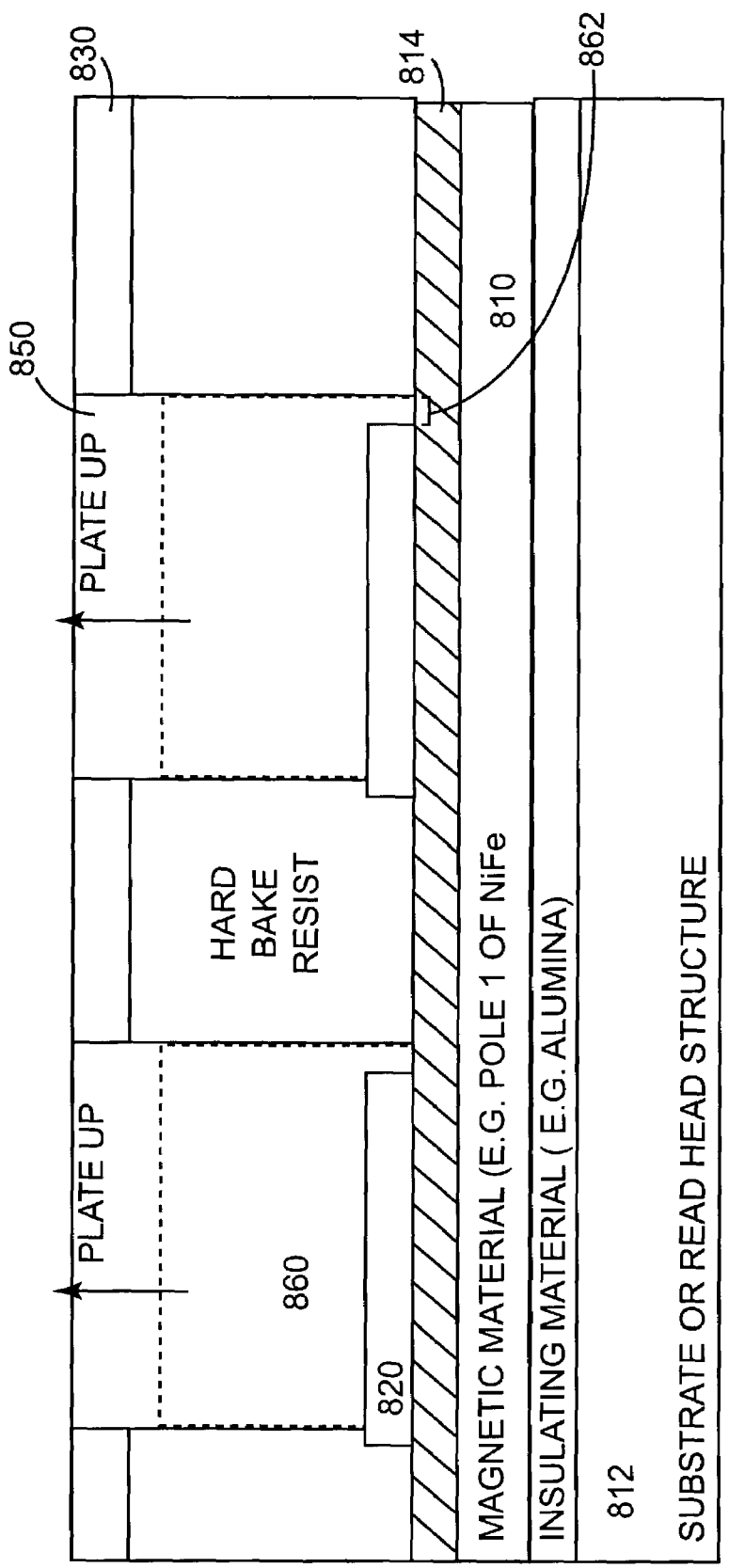

METHOD AND APPARATUS USING A PRE-PATTERNED SEED LAYER FOR PROVIDING AN ALIGNED COIL FOR AN INDUCTIVE HEAD STRUCTURE

BACKGROUND OF THE INVENTION

1. Field of the Invention

This invention relates in general to magnetic transducers, and more particularly to a method and apparatus for providing an aligned coil for an inductive head structure using a patterned seed layer.

2. Description of Related Art

Magnetic recording is a key and invaluable segment of the information-processing industry. While the basic principles are one hundred years old for early tape devices, and over forty years old for magnetic hard disk drives, an influx of technical innovations continues to extend the storage capacity and performance of magnetic recording products. For hard disk drives, the areal density or density of written data bits on the magnetic medium has increased by a factor of more than two million since the first disk drive was applied to data storage. Since 1991, areal density has grown by the well-known 60% compound growth rate, and this is based on corresponding improvements in heads, media, drive electronics, and mechanics.

Magnetic recording heads have been considered the most significant factor in areal-density growth. The ability of these components to both write and subsequently read magnetically recorded data from the medium at data densities well into the Gbits/in$^2$ range gives hard disk drives the power to remain the dominant storage device for many years to come.

The heart of a computer is an assembly that is referred to as a magnetic disk drive. The disk drive includes a rotating magnetic disk, write and read heads that are suspended by a suspension arm above the rotating disk and an actuator that swings the suspension arm to place the read and write heads over selected circular tracks on the rotating disk. The read and write heads are directly mounted on a slider that has an air bearing surface (ABS). The suspension arm biases the slider into contact with the surface of the disk when the disk is not rotating. However, when the disk rotates, air is compressed by the rotating disk adjacent the ABS causing the slider to ride on an air bearing a slight distance from the surface of the rotating disk. The write and read heads are employed for writing magnetic impressions to and reading magnetic impressions from the rotating disk. The read and write heads are connected to processing circuitry that operates according to a computer program to implement the writing and reading functions.

Prior to 1991, heads were designed with a single inductive sensor performing both reading and writing functions. The decreasing signal amplitude resulting from areal densities exceeding 500 Mbits/in$^2$ promoted the development of magnetoresistive and giant-magnetoresistive read sensors merged with an inductive head, which now performed a write function only. While write track widths can be wider than the corresponding read widths, i.e. "write wide and read narrow", inductive sensors must be redesigned with narrower gaps and pole geometries. At these higher data densities, pole edge effects become more significant. Coil widths and numbers of turns, all attained by advanced photolithographic techniques over large topographies, must be optimized to achieve adequate inductance focused within a very small writing area on the medium. Finally, it is a consequence of increased areal density that the media or internal data rate, i.e. the rate at which information is written and read within a disk drive, is increased.

A write head includes a coil layer embedded in first, second and third insulation layers (insulation stack), the insulation stack being sandwiched between first and second pole piece layers. A write gap layer between the first and second pole piece layers forms a magnetic gap at an air bearing surface (ABS) of the write head. The pole piece layers are connected at a backgap. Current conducted to the coil layer induces a magnetic field across the magnetic gap between the pole pieces. This field fringes across the magnetic gap for the purpose of writing information in tracks on moving media, such as the circular tracks on the aforementioned rotating disk or a linearly moving magnetic tape in a tape drive.

The read head includes first and second shield layers, first and second gap layers, a read sensor and first and second lead layers that are connected to the read sensor for conducting a sense current through the read sensor. The first and second gap layers are located between the first and second shield layers and the read sensor and the first and second lead layers are located between the first and second gap layers. The distance between the first and second shield layers determines the linear read density of the read head. The read sensor has first and second side edges that define a track width of the read head. The product of the linear density and the track density equals the areal density of the read head which is the bit reading capability of the read head per square inch of the magnetic media.

As mentioned above, a significant factor in achieving gigabyte densities in computers has been increasing the track density of the write head. Track density is expressed in the art as tracks per inch (TPI) which is the number of tracks that the write head can write per inch of width of a rotating disk or linearly moving magnetic tape.

The coil inductance per square turn can be reduced by decreasing the coil diameter, requiring a smaller coil pitch. However, current processing of electroplating the coil limits the coil pitch. The primary failure mode is inter-coil turn shorting to each other. The magnetic-circuit part of the inductance is dominated by the flux which fringes between the two poles and is reduced by decreasing the volume of driven magnetic material and also by increasing the separation of the two poles. But an adequate cross-section of the poles must be maintained to prevent saturation. Therefore, the easiest way to speed up a write head is to reduce the yoke length. The use of two or more coil layers facilitates these geometry changes at the expense of process complexity. If magnetic recording is to continue increasing in areal density more rapidly than semiconductor devices, a point will be reached where the lithographic resolution demands for critical dimensions of heads will exceed the capability of the conventional tooling available.

It can be seen that there is a need for a method and apparatus that provides narrower write coils to allow reduced yoke lengths and therefore greater areal densities.

SUMMARY OF THE INVENTION

To overcome the limitations in the prior art described above, and to overcome other limitations that will become apparent upon reading and understanding the present specification, the present invention discloses a method and apparatus for providing an aligned coil for an inductive head structure using a patterned seed layer.

The present invention solves the above-described problems by using an aligned process where the base plate imprint is fabricated on an electrically insulating layer and the reversed image is fabricated and etched into the coil insulation material, e.g., hard bake photoresist to alleviate the problems associated with complete ion removal of the seed layer between high aspect ratio coils. The present invention would also not be prone to plating non-uniformities (voids), and would not be subject to seed layer undercutting in a wet etch step process.

A method in accordance with the principles of the present invention includes providing an insulation layer over a magnetic material, depositing a pre-patterned seed layer over the insulation layer, forming a hard bake resist layer, the hard bake resist layer overlying the seed layer and the insulation layer, patterning said hard bake resist layer to form trenches and depositing an electroplatable metal in the trenches to form a coil, wherein the electroplatable metal is aligned with the seed layer via the trenches.

In another embodiment of the present invention, an inductive head is described. The inductive head includes an insulation layer provided over a magnetic material, a pre-patterned seed layer deposited over the insulation layer, a hard bake resist layer formed to overlay the seed layer and the insulation layer, wherein the hard bake resist layer to form trenches and an electroplatable metal formed in the trenches to establish a coil, wherein the electroplatable metal is aligned with the seed layer via the trenches.

In another embodiment of the present invention, a magnetic storage device is described. The magnetic storage device head includes magnetic media for storing data thereon, a motor for translating the position of the magnetic media, an actuator for positioning a magnetic head relative to the magnetic media, the magnetic head including an inductive head formed using an aligned coil for an inductive head structure, the inductive head further comprising an insulation layer provided over a magnetic material, a pre-patterned seed layer deposited over the insulation layer, a hard bake resist layer formed to overlay the seed layer and the insulation layer, wherein the hard bake resist layer to form trenches and an electroplatable metal formed in the trenches to establish a coil, wherein the electroplatable metal is aligned with the seed layer via the trenches.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIGS. 8a–8i illustrate the process of forming an aligned coil for an inductive head structure using a patterned seed layer according to the present invention;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for providing an aligned coil for an inductive head structure using a patterned seed layer. The present invention solves the above-described problems by using an aligned process where the base plate imprint is fabricated on an electrically insulating layer and the reversed image is fabricated and etched into the coil insulation material, e.g., hard bake photoresist to alleviate the problems associated with complete ion removal of the seed layer between high aspect ratio coils. The present invention would also not be prone to plating non-uniformities (voids), and would not be subject to seed layer undercutting in a wet etch step process.

Figure 1:
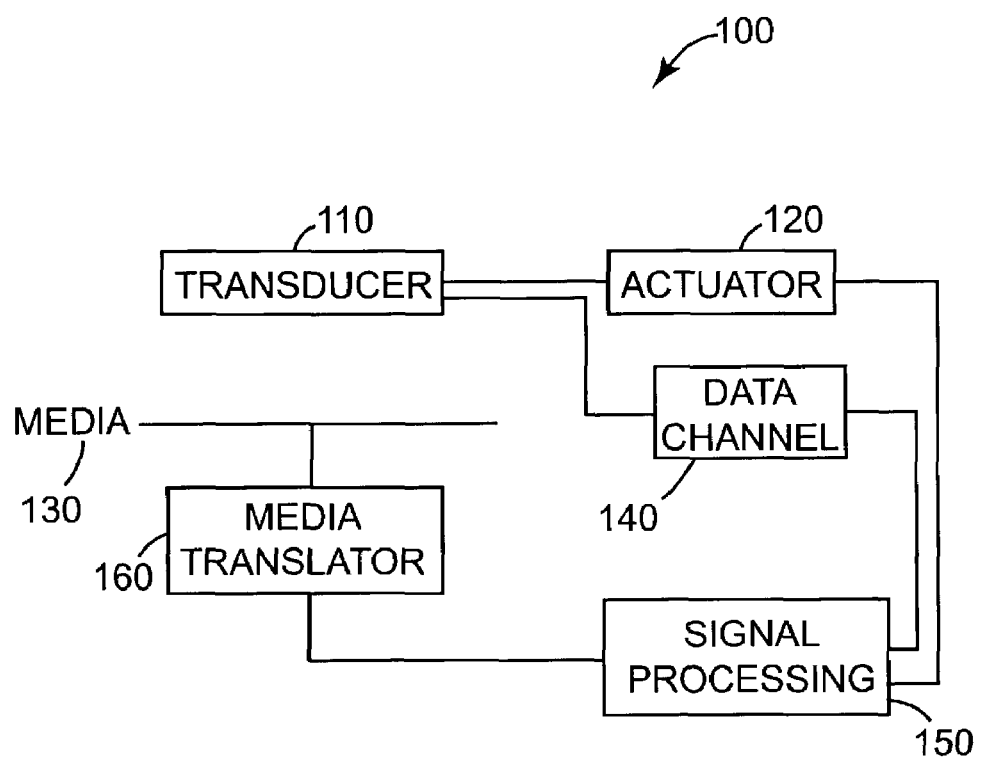
FIG. 1 illustrates a storage system according to the present invention.

FIG. 1 illustrates a storage system 100 according to the present invention. In FIG. 1, a transducer 110 is under control of an actuator 120. The actuator 120 controls the position of the transducer 110. The transducer 110 writes and reads data on magnetic media 130. The read/write signals are passed to a data channel 140. A system processor 150 controls the actuator 120 and processes the signals of the data channel 140. In addition, a media translator 160 is controlled by a system processor 150 to cause the magnetic media 130 to move relative to the transducer 110. The present invention is not meant to be limited to a particular type of storage system 100 or to the type of media 130 used in the storage system 100.

Figure 2:
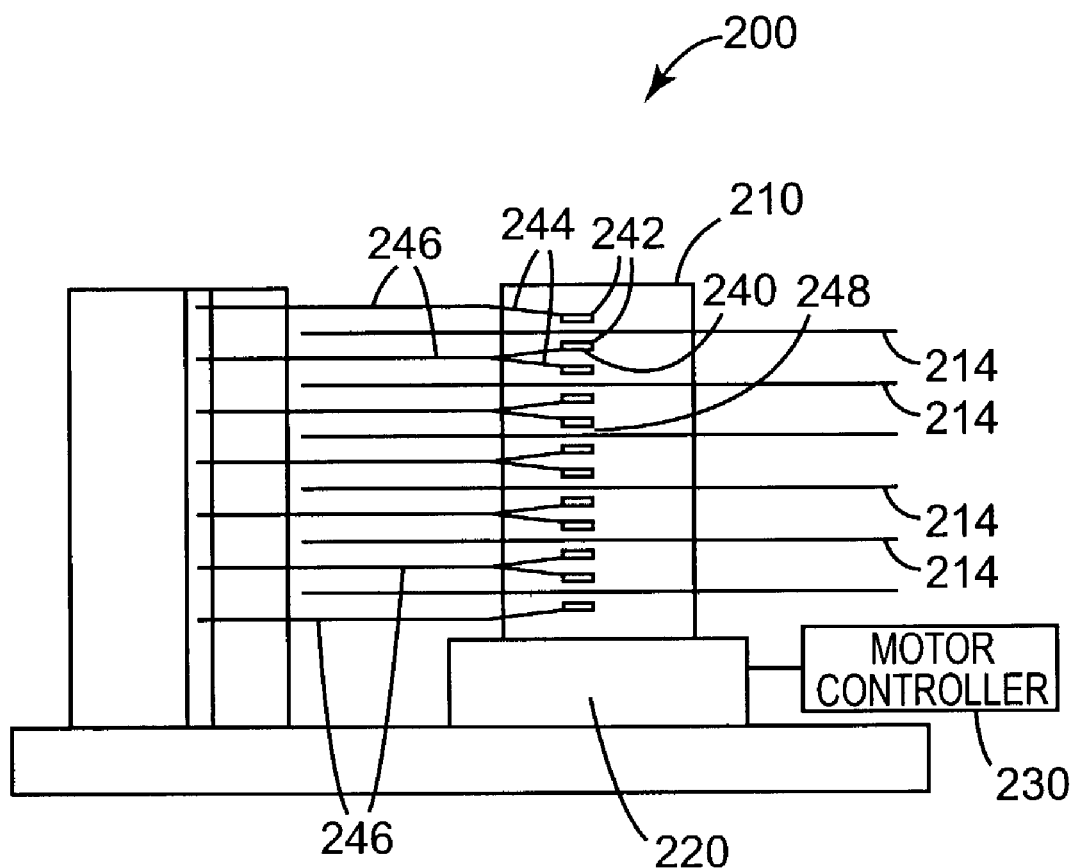
FIG. 2 illustrates one particular embodiment of a storage system according to the present invention.

FIG. 2 illustrates one particular embodiment of a storage system 200 according to the present invention. In FIG. 2, a hard disk drive 200 is shown. The drive 200 includes a spindle 210 that supports and rotates a magnetic disk 214. The spindle 210 is rotated by a motor 220 that is controlled by a motor controller 230. A combined read and write magnetic head 240 is mounted on a slider 242 that is supported by a suspension 244 and actuator arm 246. Processing circuitry (not shown in FIG. 2, but represented by Signal Processing 150 in FIG. 1) exchanges signals, representing such information, with the head 240, provides motor drive signals for rotating the magnetic disk 214, and provides control signals for moving the slider to various tracks. A plurality of disks 214, sliders 242 and suspensions 244 may be employed in a large capacity direct access storage device (DASD).

The suspension 244 and actuator arm 246 position the slider 242 so that the magnetic head 240 is in a transducing relationship with a surface of the magnetic disk 214. When the disk 214 is rotated by the motor 220 the slider 240 is supported on a thin cushion of air (air bearing) between the surface of the disk 214 and the air bearing surface (ABS) 248. The magnetic head 240 may then be employed for writing information to multiple circular tracks on the surface of the disk 214, as well as for reading information therefrom.

Figure 3:
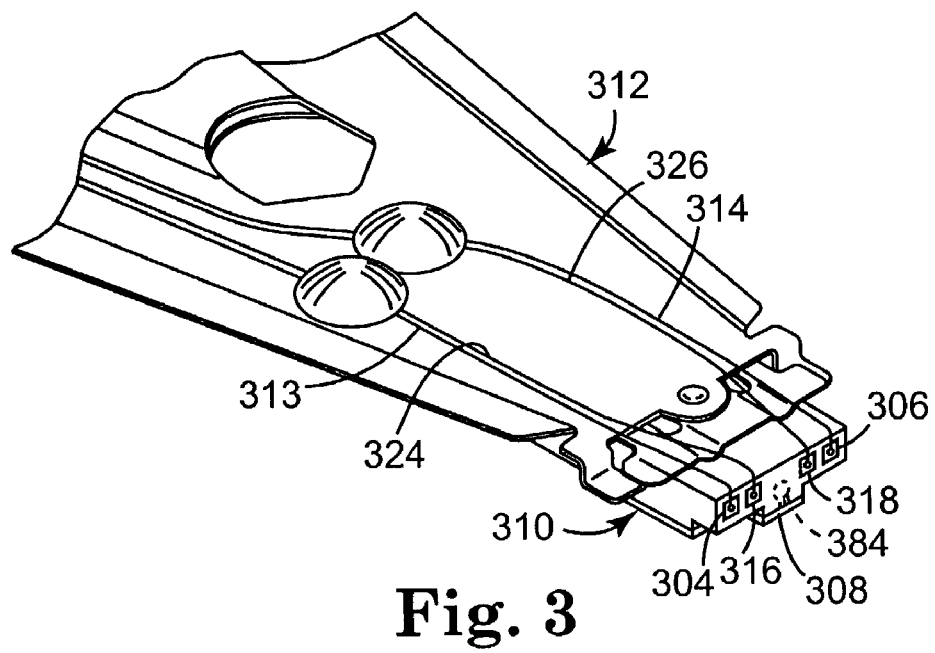
FIG. 3 illustrates a slider mounted on a suspension.

FIG. 3 illustrates a slider 310 mounted on a suspension 312. In FIG. 3 first and second solder connections 304 and 306 connect leads from the sensor 308 to leads 313 and 314 on the suspension 312 and third and fourth solder connections 316 and 318 connect the coil 384 to leads 324 and 326 on the suspension.

Figure 4:
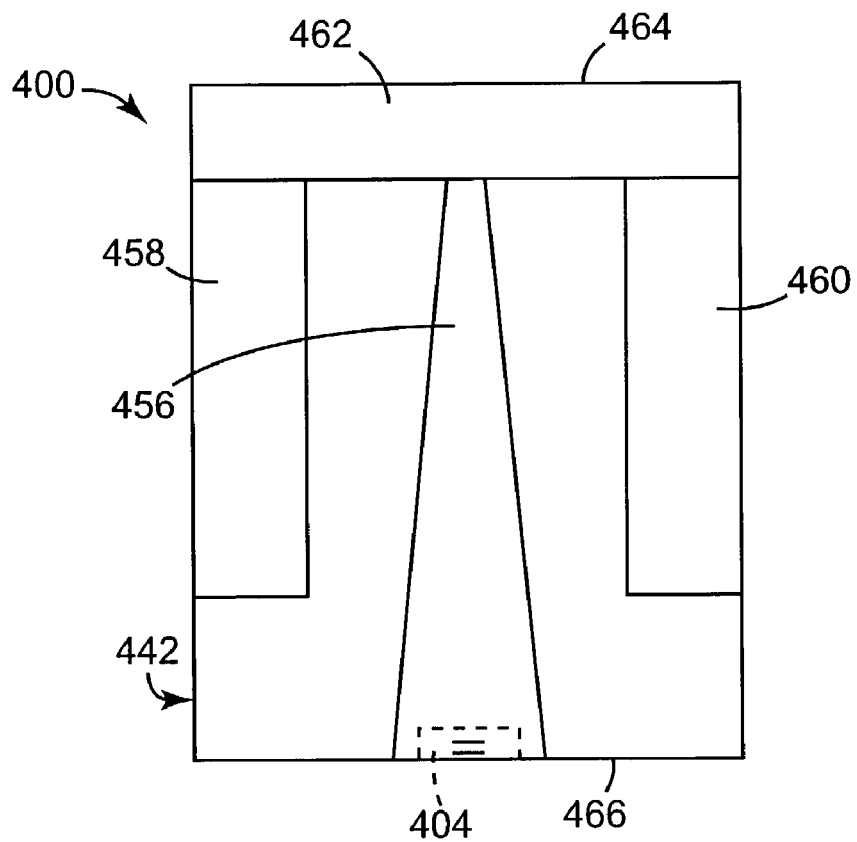
FIG. 4 is an ABS view of the slider and the magnetic head.

FIG. 4 is an ABS view of the slider 400 and the magnetic head 404. The slider has a center rail 456 that supports the magnetic head 404, and side rails 458 and 460. The rails 456, 458 and 460 extend from a cross rail 462. With respect to rotation of a magnetic disk, the cross rail 462 is at a leading edge 464 of the slider and the magnetic head 404 is at a trailing edge 466 of the slider.

Figure 5:
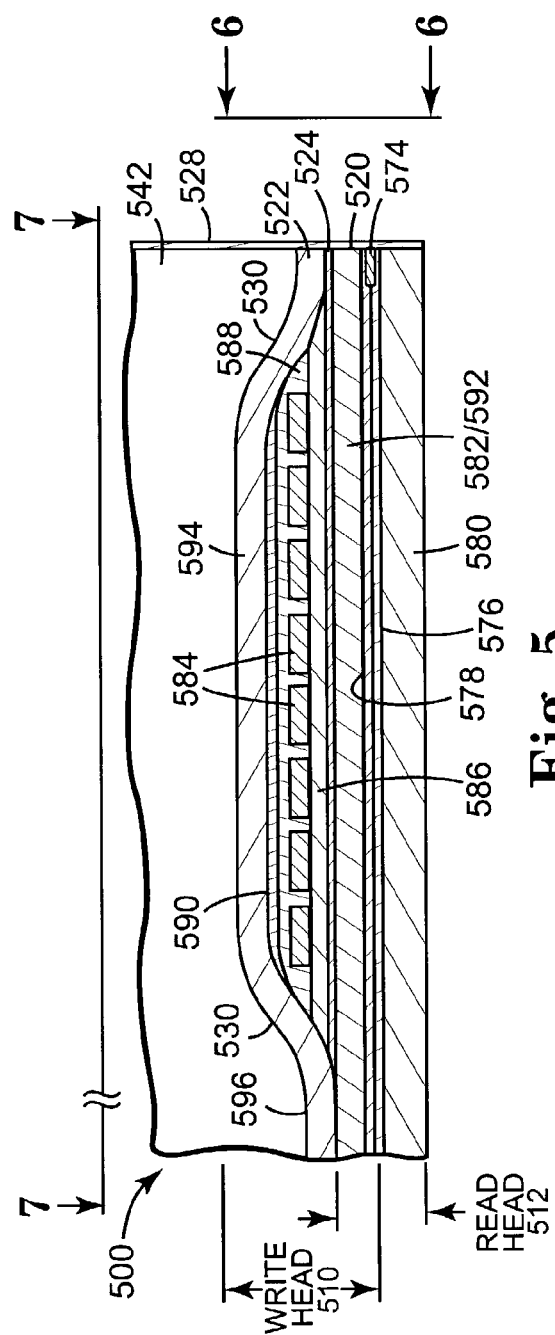
FIG. 5 is a side cross-sectional elevation view of a merged MR or spin valve head which has a write head portion and a read head portion, the read head portion employing an MR or spin valve sensor.

FIG. 5 is a side cross-sectional elevation view of a merged MR or spin valve head 500 which has a write head portion 510 and a read head portion 512, the read head portion employing an MR or spin valve sensor 574. The head portion of the merged head includes a coil layer 584 located between first and second insulation layers 586 and 588. A third insulation layer 590 may be employed for planarizing the head to eliminate ripples in the second insulation layer caused by the coil layer 584. The first, second and third insulation layers are referred to in the art as an "insulation stack". The coil layer 584 and the first, second and third insulation layers 586, 588 and 590 are located between first and second pole piece layers 592 and 594. The first and second pole piece layers 592 and 594 are magnetically coupled at a backgap 596 and have first and second pole tips 520 and 522 which are separated by a write gap layer 524 at the ABS. The sensor 574 is located between first and second gap layers 576 and 578 and the gap layers are located between first and second shield layers 580 and 582. The head 500 is mounted on a slider 542. A wear layer 528 may be employed for protecting the sensitive elements of the magnetic head and encapsulating the read and write head structure.

In FIG. 5, the second pole piece layer 594 has a pole tip region and a yoke region, the merging of these components being defined by a flare point 530 which is the location where the second pole piece layer 522 begins to widen as it recesses in the head 500. The second pole tip region extends from the ABS to the flare point 530, and the yoke region extends from the flare point 530 to the backgap 596. It should be noted that the merged head 500, as shown in FIG. 5, employs a single layer to serve a double function as a second shield layer 582 for the read head and as a first pole piece 592 for the write head. A piggyback head employs two separate layers for these functions.

Figure 6:
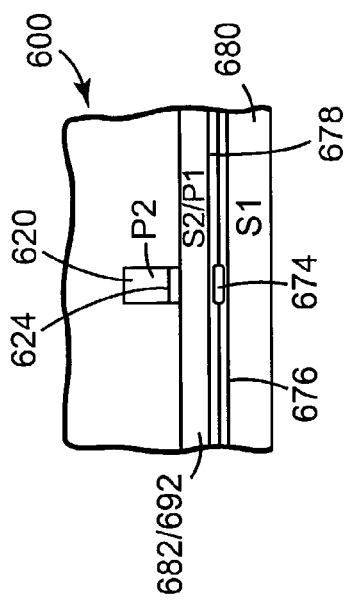
FIG. 6 is a partial ABS view of the slider taken along plane 6—6 of FIG. 5 to show the read and write elements of the prior art magnetic head.

FIG. 6 is a partial ABS view of the slider 600 taken along plane 6—6 of FIG. 5 to show the read and write elements of the prior art magnetic head. The sensor 674 is located between first and second gap layers 676 and 678 and the gap layers are located between first and second shield layers 680 and 682. Again, a single layer may serve a double function as a second shield layer 682 for the read head and as a first pole piece 692 for the write head. This single layer can be separated into a separate read head and write head layer. The second pole tip 620 is over the write gap layer 624

In response to external magnetic fields, the resistance of the sensor 674 changes. A sense current $I_s$ conducted through the sensor causes these resistance changes to be manifested as potential changes. These potential changes are then processed as readback signals by the processing circuitry 250 shown in FIG. 2.

Figure 7:
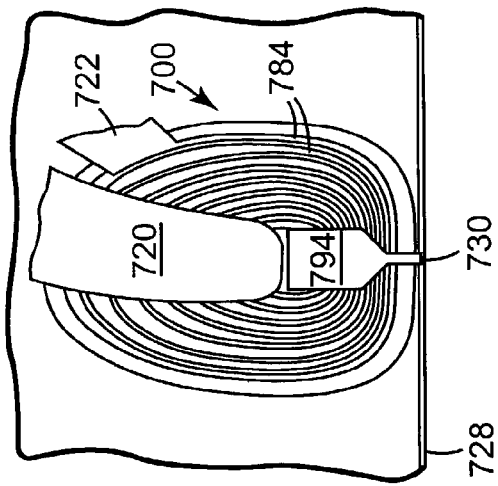
FIG. 7 is a view taken along plane 7—7 of FIG. 5 with all material above the second pole piece removed.

FIG. 7 is a view 700 taken along plane 7—7 of FIG. 5 with all material above the second pole piece removed. In FIG. 7, a coil 784 is shown. The coil is connected to leads 720, 722. The second pole piece 794 extends over the coil 784 at a pole tip 730. A wear layer 728 protects the sensitive elements of the magnetic head.

FIGS. 8a–8i illustrates the process of forming an aligned coil for an inductive head structure using a patterned seed layer according to the present invention. As yoke lengths in magnetic read/write heads shrink to several microns, one must fabricate increasingly narrower write coils with smaller pitch.

Figure 8A:
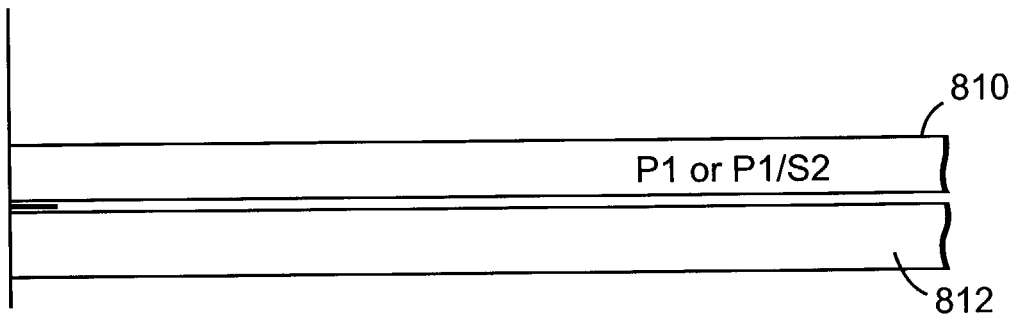
Figure 8B:
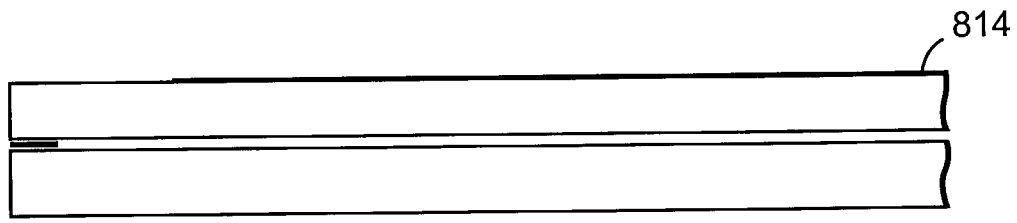

In FIG. 8a, a magnetic material 810, for example, NiFe, is disposed above a substrate 812 or read head structure 811. The magnetic material 810 may form, for example, a first pole in an inductive head. FIG. 8b shows an insulation layer 814 disposed over the magnetic material 810. The magnetic material 810 forming the pole may be covered with a RIE-able oxide, such as $SiO_2$. Optionally, an insulation layer (not shown) may also be disposed between the magnetic material 810 and the substrate 812.

Figure 8C:
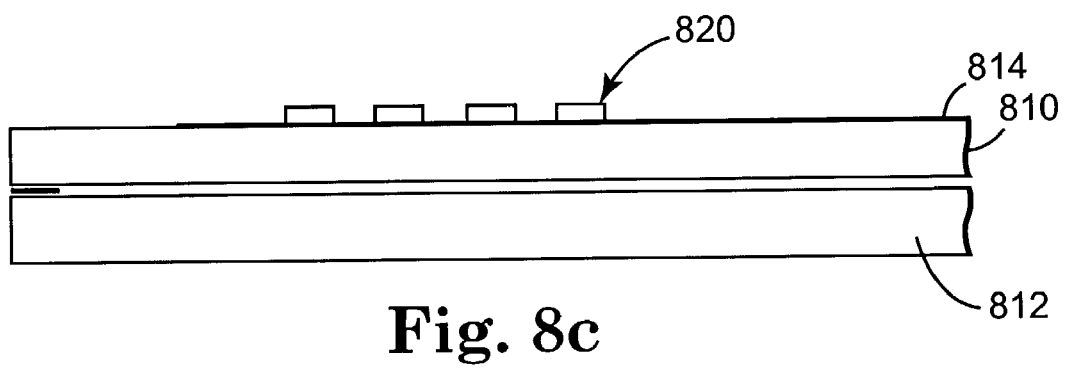
Figure 8D:
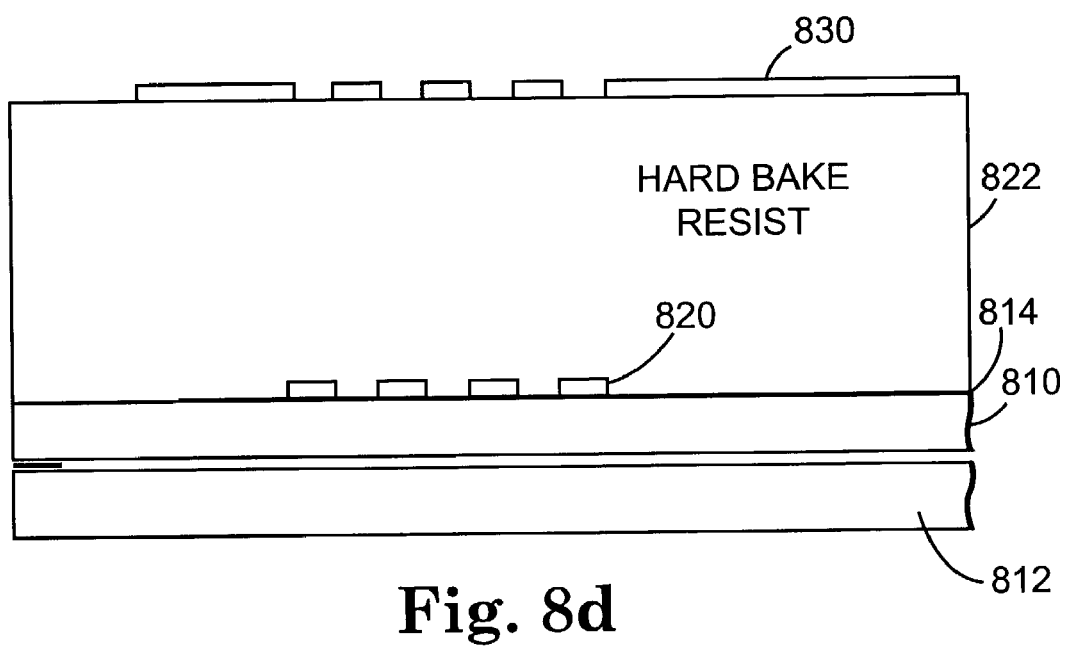

In FIG. 8c, a patterned seed layer material 820 is disposed over the magnetic material 810 and insulation layer 814. The seed layer 820 may include, for example, a copper tungsten formation (Cu/W) or a copper-silicon-carbon formation (Cu/Si/C). The seed layer 820 may also be covered with a protective material capable of being etched by reactive ion etching (e.g. crosslinked photoresist). Next, as shown in FIG. 8d, a hard bake resist 822 is formed over the seed layer 820.

According to the present invention, an aligned process is used where the base plate imprint 820 is fabricated on an electrically insulating layer 814. The reverse image of the coil structure is fabricated and etched into the coil insulation material, e.g., hard bake photoresist. This is shown in FIG. 8d, which shows a hard mask layer 830 formed over the hard bake resist 822.

Figure 8E:
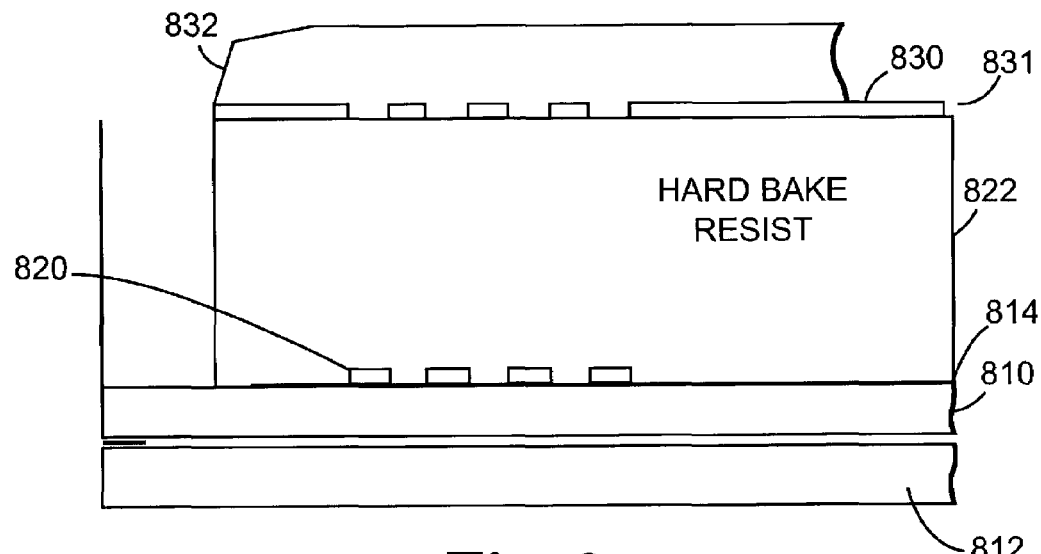
Figure 8F:
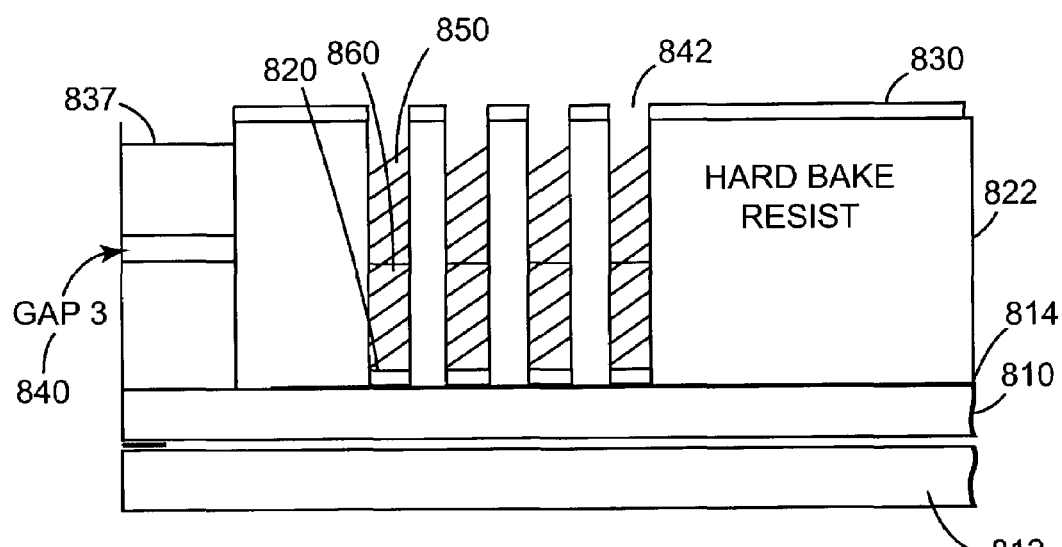

In an alternate embodiment, FIG. 8e shows the formation of a resist pad 832 which covers the transfer layer 822 and, possibly, the hard mask layer 830. The exposure of other area of the hard mask level 831 creates the opportunity to electroplate a different material (e.g. NiFe) 837 that is coplanar with the electroplated coil. As shown in FIG. 8f, this separate plating step may include a non-magnetic layer 840. Upon removal of the patterned resist layer 832, one can etch through a patterned hard mask layer 830 and create openings 850 which expose the patterned seed layer 820 at the bottom of said trenches 850.

FIG. 8g shows the covering 852 of the pole tip and the deposition of an electroplatable metal 860, for example copper, in the trenches 850. The electroplatable metal 860 is plated-up in the trenches 850 using an electroplating bath. In a preferred embodiment, the coil structure 860 that is plated up has the coil insulation in-situ where no post-plating insulation fill process is required. The aspect ratio of the coils 860 is limited by the reactive ion etching (RIE) process. The plated coil structure 860 is plated in at least most of the thickness of the resist 822 in method of creating the coils. Afterwards, the plated coils are planarized to a somewhat smooth surface 859 which defines the top of the plated coils. After planarization, the top surface 859 will be below the hard mask 830 level location. This planarized surface is shown as a dotted line in FIG. 8g. An alternate method for creating the coils is to underplate the coils below thickness of the resist 822. The plated coil structure 860 would subsequently be encapsulated by an insulator. An example of this would be an addition photoresist or pattern insulation layer 832. Inclusion of this layer is shown in FIG. 8h.

In FIG. 8h, a possible head with this coil structure is shown. A patterned coil 860 where the top surface 859 was planarized would be electrically isolated from a magnetic layer 868. This coil could also be electrically isolated from an additional coil structure that is fabricated above the coil level shown. However, if additional coil levels are fabricated, only the turns of the coil would be electrically isolated from adjacent turns.

While the method according to the present invention will require two critical photo steps where the relative overlay error 862, as shown in FIG. 8i, could not be greater than 50% of the width separating of the copper coils, such precision is already required when aligning the pole tip over the read sensor. This limitation will scale with a decrease in coil dimensions. Ideally, the pitch of the coils would be less than 1.0 µm and a separation of 0.3 µm, so the allowable misalignment would be less 0.15 µm.

Accordingly, the method of coil fabrication according to the present invention requires no seed layer removal. The present invention thus alleviates the problems associated with complete ion removal of the seed layer between high aspect ratio coils. Also, the present invention is not prone to plating non-uniformities (voids), and is subject to seed layer undercutting in a wet etch step process. This last point may be even more uncontrollable as the coil aspect ratios increase.

The present invention provides the advantages that the coil layer and pole tip can be defined using thin resist lithography on a primarily planar surface, a magnetic write pole tip can be defined coplanar with the coils, and no aspect ratio depleting seed layer removal step is required.

Figure 9A:
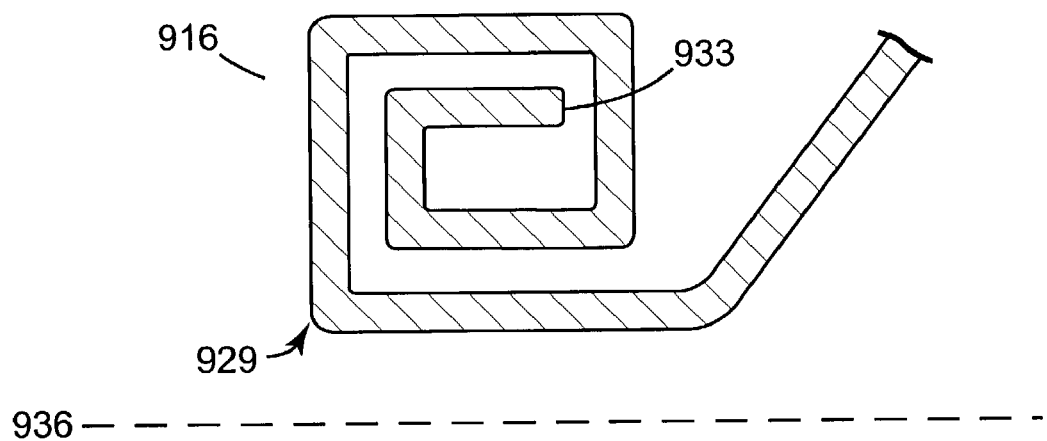
FIGS. 9a–c show the details of the patterned seed layer.
Figure 9B:
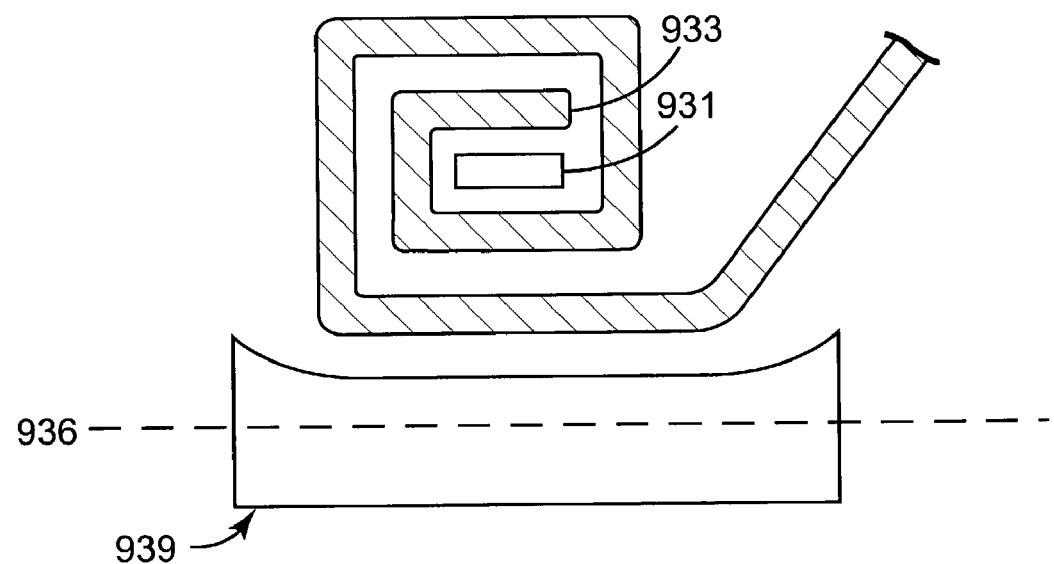
Figure 9C:
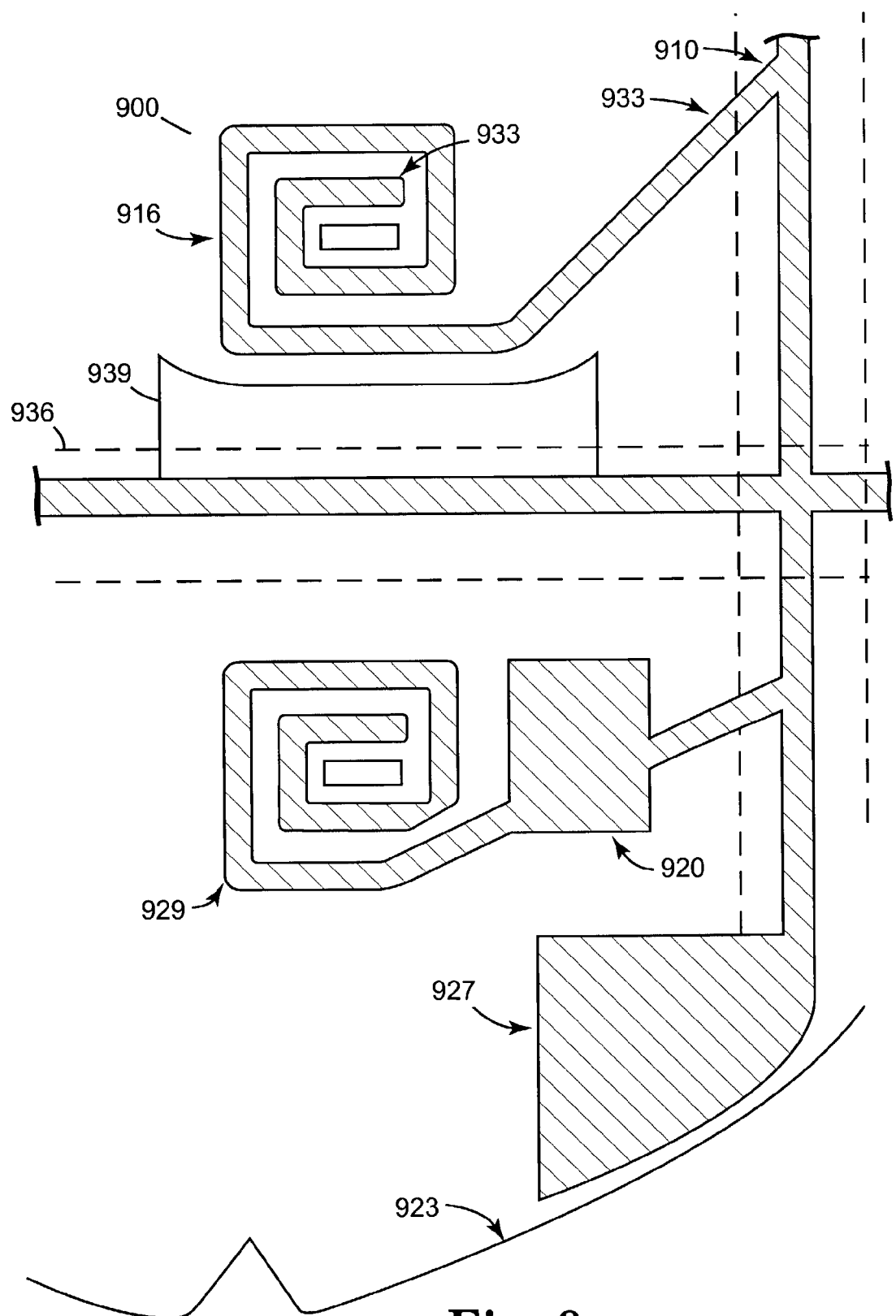

There are several details of the patterned seed layer as illustrated in FIGS. 9a–9c. This includes details within the area of the head, the area between sliders on the wafer or the kerf, and the electroplatable contact pads on the edge of the wafer.

Referring to FIGS. 9a–9b, first, the copper containing seed layer makes multiple turns of a coil 916, including last turn 929, where the center tap 933 will be the location where the coil circuit will be completed at a different time in the process. The coil 916 is shown in relation to the future ABS plane 936. In FIG. 9b, the magnetic pedestal 939 is shown. There will also be a via for magnetic backgap 931.

Now referring to FIG. 9c, the last turn of the coil 929 extends to and beyond via pads. Beyond the via pads 920, the seed layer is in electrical contact with other patterned seed layer structures from adjacent heads. The interconnection of coil shaped seed layer structures also allows all coils to be plated in the same process step.

Having all the interconnections of the kerf 910 allows a subsequent field etch step to remove all the unwanted plated copper along with the seed layer in the kerf. This removal electrically isolates each copper coil structure on the wafer. If the unwanted material is not removed, the location of copper in the kerf allows the material to be physically removed during slider fab. The final slider product would have seed layer portion exposed at the edge of the slider 933. This would be a discoverable artifact that the patterned seed layer was used.

The ferromagnetic elements will be done after the coils are plated. The fabrication of the ferromagnetic elements, which generally are made by electroplating, demands the opening for the backgap, deposition of magnetic seed layer, resist patterning and finally plating and seed removal. Because the coils are already plated and the space between copper coils is covered by the hard baked resist where there is no problem with the magnetic seed layer causing inter-coil shorts. After the magnetic plating the wafer is planarized via CMP. It can be excess plated magnetic material cover the hard baked resist of the coils (as in the backgap region for example). This excess material will be removed in CMP step. This pole piece location would overlap the edge of the slider that will eventually become the ABS plane 936. This is shown in FIGS. 9a and 9b.

FIG. 9c shows a high aspect ratio seed layer matrix mask 900. The patterned mask 900 having a multi-turn coil 916 is fabricated as a plated seed layer mask. This patterned seed layer mask 900 could also have large probe pads 920 at the side of the wafer for a future head structure contact. This solves the problem of seed removal in a coil structure where the aspect ratio is large. FIG. 9c shows the patterned seed layer mask 910 containing interconnected coils 930 that have an electrical contact to a plating pad 927. This plating contact 927 is located usually at the edge of the wafer 923.

Figure 10:
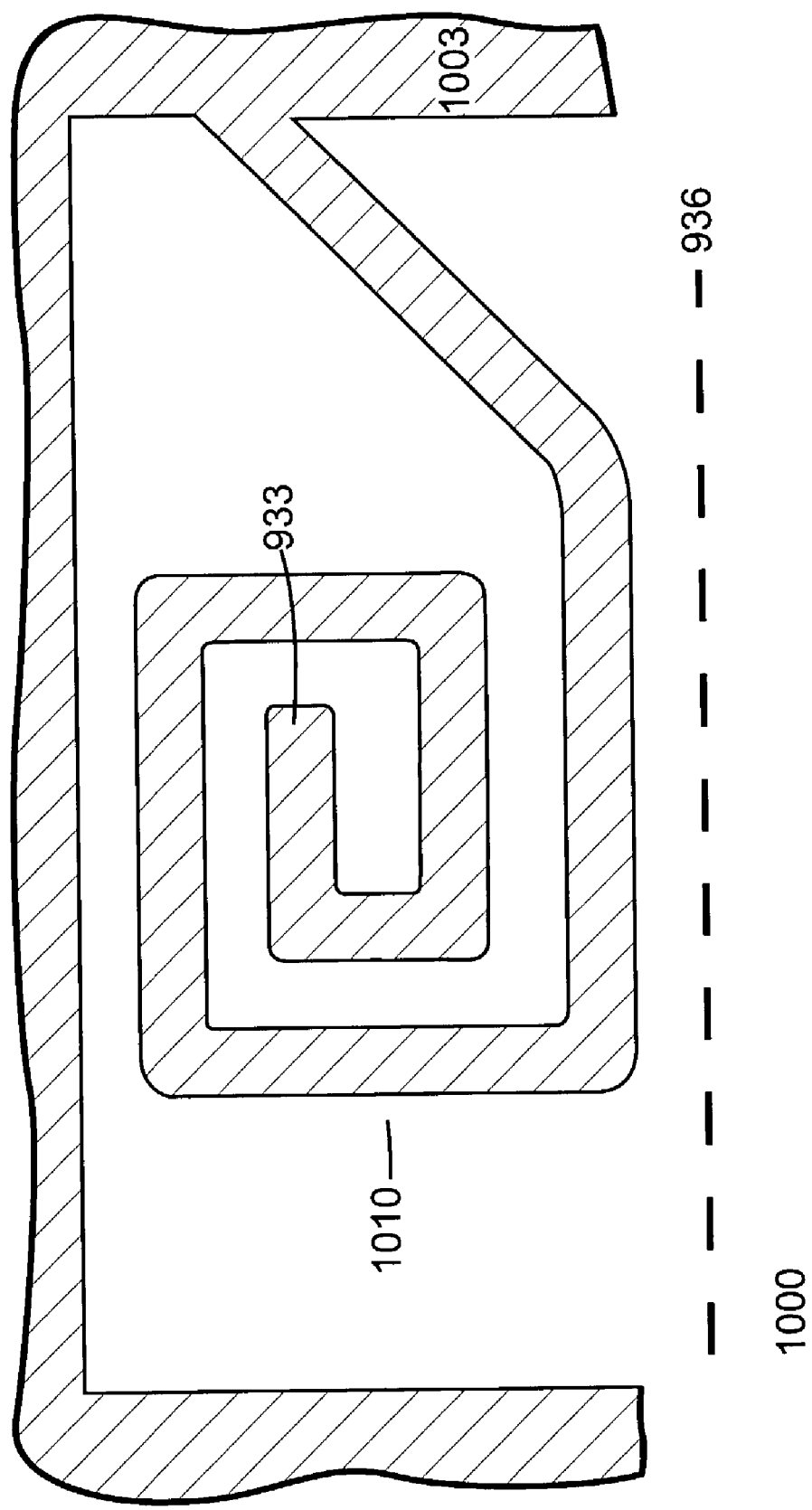
FIG. 10 illustrates another embodiment according to the present invention wherein only the coil area is patterned and the remaining areas are full film.
Figure 11:
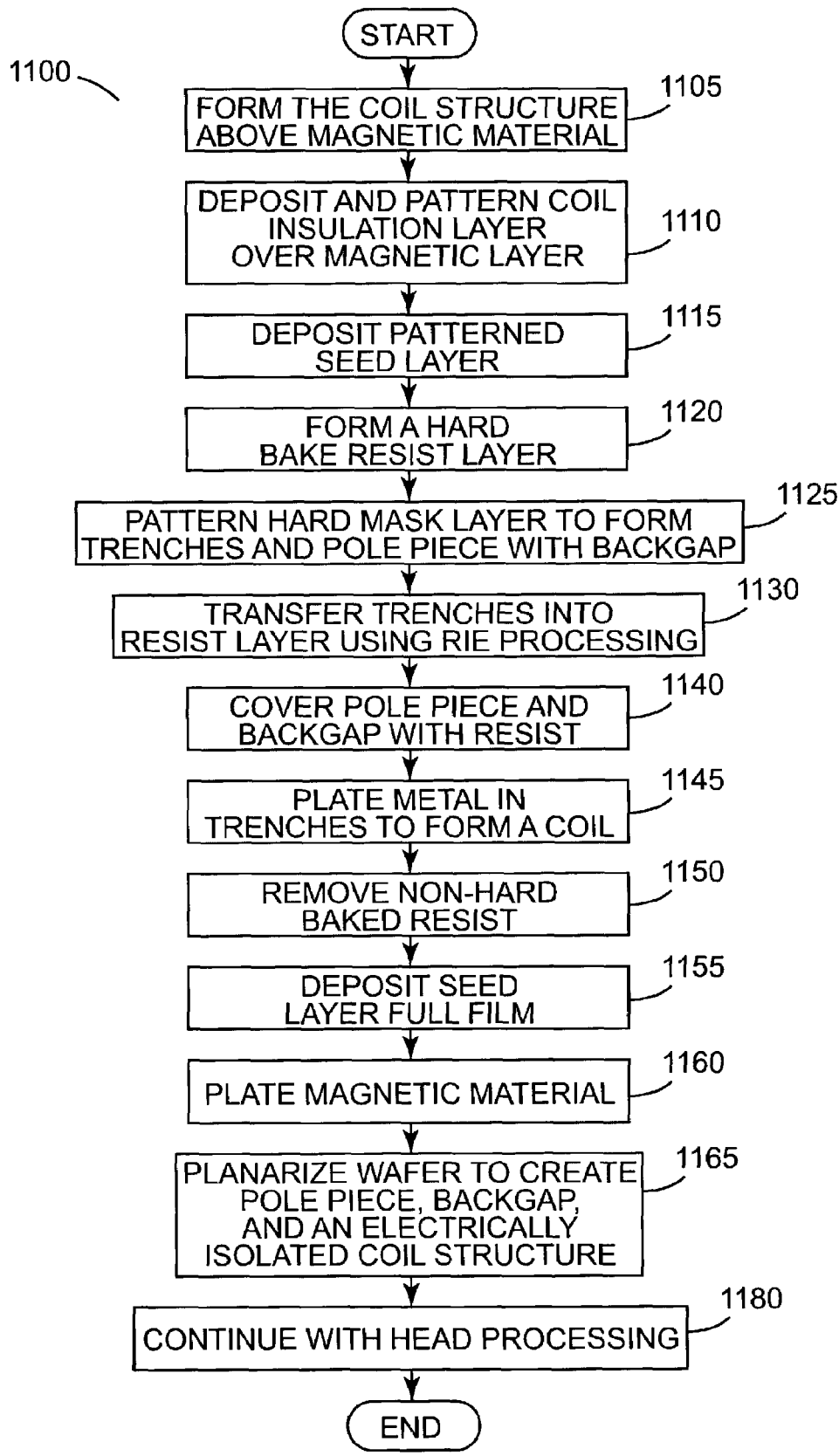
FIG. 11 is a flow chart of a process to incorporate an aligned coil structure with a coplanar pole piece according to the present invention.

FIG. 10 illustrates another embodiment 1000 according to the present invention wherein only the coil area 1010 is patterned and the remaining areas 1003 are full film. The remaining areas 1003 would be removed during a seed layer step to electrically isolate the coil structures. By using two lithography steps to define the coils 1010, no seed removal step is needed when high aspect ratio coils are produced FIG. 11 is a flow chart 1100 of a process to incorporate an aligned coil structure with a coplanar pole piece. This coil structure is formed above magnetic material 1105, with the coil seed that is electrically isolated from this material 1110. On this insulation layer, a patterned seed layer is deposited 1115. This layer includes conductive material that connects the seed to external plating contacts. Above the patterned seed, a hard bake resist layer is formed 1120. Above the hard bake resist is a hard mask (e.g. SiO2) that is patterned via lithography step and a RIE step to transfer the pattern into the hard bake 1125. This transfer will not only include the coil but also a pole piece 1130. In order to plate only the coils, the pole piece structures are selectively protected under resist 1140. This will allow one to plate a coil structure (e.g., with copper) 1145. One must remove the resist protecting the pole piece structures 1150. In order to make a continuous (or near continuous) magnetic flux path between the magnetic layer below the coil and the pole piece, a magnetic layer is deposited across the entire wafer 1155. The magnetic pole piece along with the entire wafer is plated in the same process step 1160. A planarization process is applied to remove excess plated material and resist. This planarization process will electrically isolate the coil structure from the magnetic pole piece 1165. The remainder of the magnetic head would then be fabricated 1180.

Figure 12:
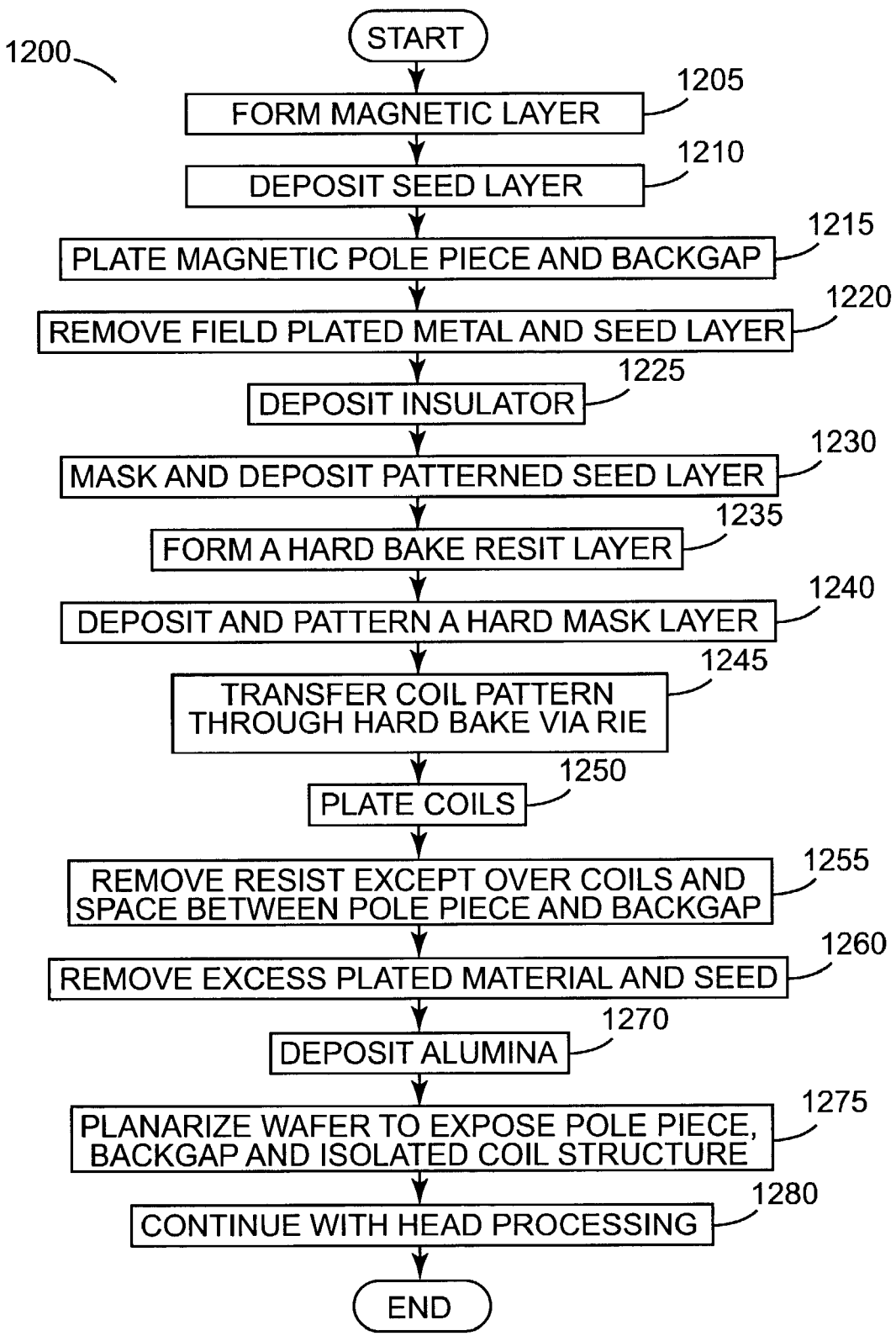
FIG. 12 is a flow chart of a process to incorporate an aligned coil structure with a coplanar pole piece according to the present invention.

FIG. 12 is a flow chart 1200 of a process to incorporate an aligned coil structure with a coplanar pole piece. The pole piece is created above this magnetic layer. First, a magnetic seed is deposited across the wafer 1210. Then a magnetic pole piece is patterned and plated. This structure also includes the backgap portion of an inductive write head 1215. Excess plated material and seed layer material is removed from the non-device region 1220. An insulator material (e.g. alumina) is deposited to electrically isolate the pole piece form subsequent processing 1225. A coil patterned seed layer is patterned and deposited 1230. The wafer is then covered with a layer of resist which may be hard baked 1235. A hard transfer mask (e.g. silica) is then deposited over the resist and is patterned via RIE 1240. The image in the hard mask is then transferred down through the resist via RIE 1245. The coils will be plated 1250. Ideally, the resist will be removed and replaced only over the coils and the space between the coil and pole piece 1255. Excess plated and seed layer material in the field (outside the device region) would be removed 1260. The field will be filled with hard material (e.g. alumina) 1270. A planarization process is applied to remove excess plated and fill material, e.g., alumina. This planarization process will electrically isolate the coil structure from the magnetic pole piece 1275. The remainder of the head would then be fabricated 1280.

Figure 13:
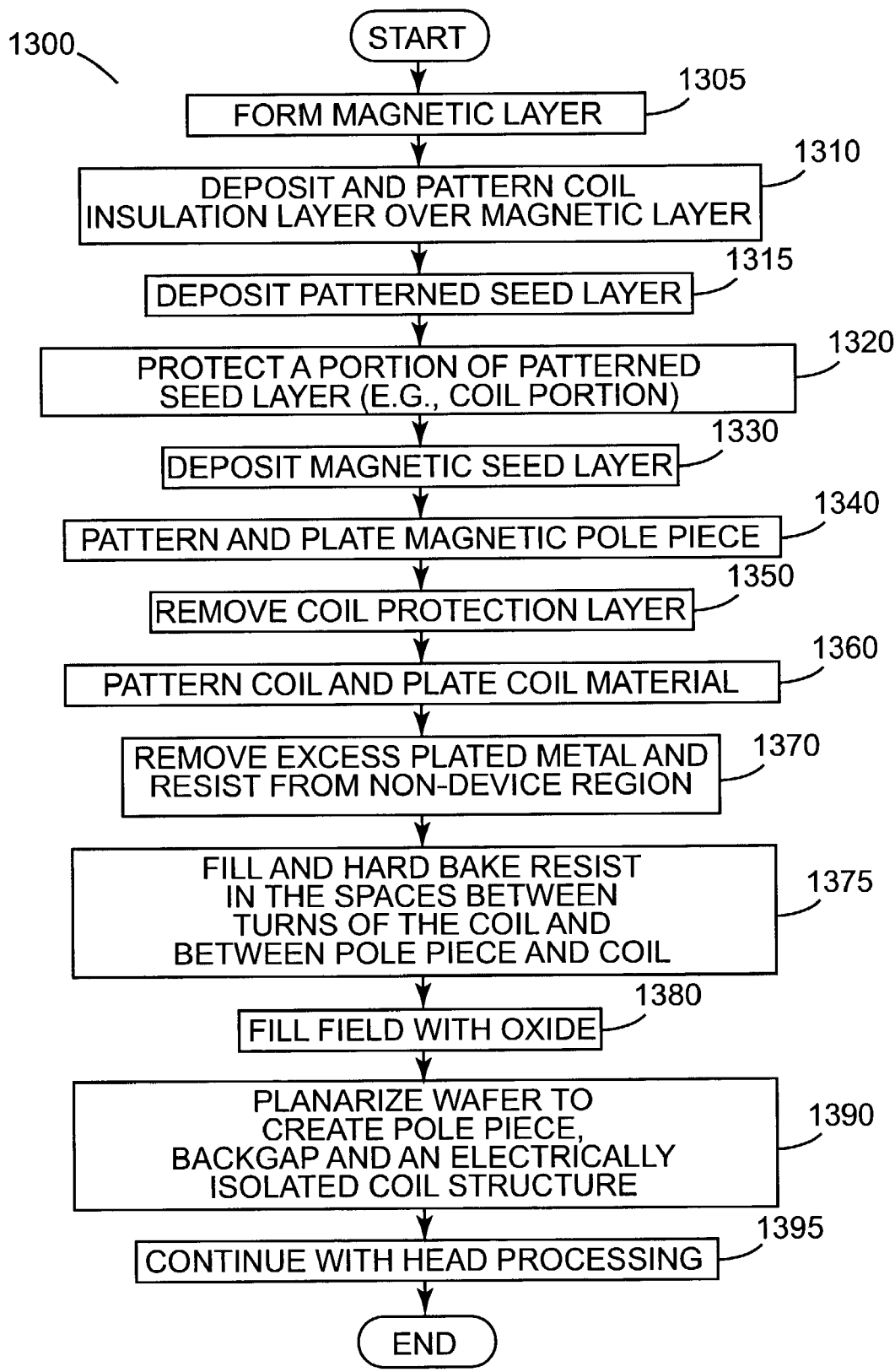
FIG. 13 is a flow chart of a process to incorporate an aligned coil structure with a co-planar pole piece according to the present invention.

FIG. 13 is a flow chart 1300 of a process to incorporate an aligned coil structure with a co-planar pole piece. This coil structure is formed above a magnetic material 1305, with a coil seed layer which is electrically isolated from this material 1310. On top of this insulator material, the patterned seed layer would be patterned and deposited 1315. The coil portion of the seed layer can be protected under resist so that the pole piece and backgap portion may be plated without plating over the coil region 1320. A magnetic seed layer would be deposited over the resist and the filed of the wafer 1330. The pole piece and backgap would be patterned and plated with magnetic material 1340. In order to plate the coil, the protection layer must be removed. This will include the layer of magnetic seed material 1350. The coil would then be patterned and plated 1360. In order to electrically isolate the device on the wafer, the excess material, both plated and seed layer, must be removed from the non-device regions 1370. Replacing the material between the coil and the pole piece with resist will prevent voids from forming and isolating the two materials 1375. The field is then filled with a hard insulating material (e.g. alumina) 1380. A planarization process is applied to remove excess plated and fill material 1390. This planarization will electrically isolate the coil structure from the magnetic pole piece. The remainder of the head would then be fabricated 1395.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing an aligned coil for an inductive head structure, comprising:

providing an insulation layer over a magnetic material;

depositing a pre-patterned seed layer over the insulation layer;

forming a hard bake resist layer, the hard bake resist layer overlying the seed layer and the insulation layer;

patterning said hard bake resist layer to form at least one trench; and depositing an electroplatable metal in the trench to form a coil, wherein the electroplatable metal is aligned with the seed layer via the trench.

2. The method of claim 1 wherein the hard bake resist layer is replaced with an oxide that is readily etchable via reactive ion etching.

3. The method of claim 1 wherein the electroplatable metal is deposited in the trench using an electroplating bath.

4. The method of claim 1 wherein the deposition of the pre-patterned seed layer and the depositing of the electroplatable metal involves two photo steps where a relative overlay error is not greater than half of a space between copper coils.

5. The method of claim 1 further comprising depositing a coil insulator over the coil.

6. The method of claim 5 further comprising forming a magnetic material over the coil insulator.

7. The method of claim 1 wherein the forming of the coil does not require seed layer removal.

8. The method of claim 1 wherein a magnetic write pole tip is defined coplanar with the coil.

9. The method of claim 1 wherein a patterned mask having a multi-turn coil for forming the seed layer is fabricated as a plated seed layer mask, wherein the plated seed layer mask includes large probe pads for plating contact.

10. The method of claim 1 wherein only a mask area for forming the coil area is patterned and peripheral areas are full film.

11. The method of claim 10 wherein material forming the seed layer located in a kerf is removed to electrically isolate the coil structures.

12. The method of claim 10 wherein material forming the plated material located in a kerf is removed to electrically isolate the coil structures.

13. The method of claim 1 where a magnetic pole structure is electroplated that is coplanar with the coil.

14. The method of claim 13 where said magnetic pole is electrically isolated from the coil.

15. The method of claim 13 where said magnetic pole contains a non-magnetic layer.

16. The method of claim 1 where depositing the electroplatable metal in the trench to form the coil comprises overplating a coil material above a height of the hard bake resist layer; and planarizing to a plane below the height of the hard bake resist.

17. The method of claim 1 where the patterned seed layer is electrically connected to plating contact pads.

18. The method of claim 17 where a portion of the patterned seed layer material are of dissimilar materials.

19. The method of claim 17 where the portions of the seed layer comprise of copper NiFe.

20. The method of claim 1 where the patterned seed layer in a kerf is electrically isolated from adjacent devices on the wafer.

* * * * *